United States Patent [19]

Satterlee et al.

[11] Patent Number: 5,383,201
[45] Date of Patent: Jan. 17, 1995

[54] METHOD AND APPARATUS FOR LOCATING SOURCE OF ERROR IN HIGH-SPEED SYNCHRONOUS SYSTEMS

[75] Inventors: Chris Satterlee, San Jose; Duncan Penman, Sunnyvale, both of Calif.

[73] Assignee: Amdahl Corporation, Sunnyvale, Calif.

[21] Appl. No.: 813,891

[22] Filed: Dec. 23, 1991

[51] Int. Cl.⁶ .......................................... G06F 11/00
[52] U.S. Cl. ............................................... 371/29.1
[58] Field of Search ............... 371/16.5, 29.1, 16.1; 395/575

[56] References Cited

U.S. PATENT DOCUMENTS

| | | | |
|---|---|---|---|
| 4,661,953 | 4/1987 | Venkatesh et al. | 371/16.5 |
| 4,679,195 | 7/1987 | Dewey | 371/16.5 |
| 4,773,064 | 9/1988 | Nirschl | 371/69.1 |
| 5,101,408 | 3/1992 | Kitsuregawa et al. | 371/16.5 |
| 5,157,667 | 10/1992 | Carusone, Jr. et al. | 371/29.1 |
| 5,220,567 | 6/1993 | Dooley et al. | 371/29.1 |

*Primary Examiner*—Charles E. Atkinson
*Attorney, Agent, or Firm*—Fliesler, Dubb, Meyer & Lovejoy

[57] ABSTRACT

A method and apparatus for locating the source of first error in a high speed synchronous system having a plurality of potential sources for first error is disclosed. An error-report collecting cell is provided having a plurality of self-freezing error history latches each including an output coupled to an report-condensing OR gate and a first-error code storing register. The report-condensing OR gate freezes a code value stored in the code register upon receipt of a first error report. The frozen code identifies the source of the first received error report. The report-condensing OR gate further initiates a clock counter upon receipt of the first error report. When system clocks stop, the contents of the clock counter indicate the number of clocks occurring between stoppage and receipt of the first error report by the cell. An error communication network is formed comprising a plurality of the above-described cells each receiving an error report either directly from an error detector or from another cell. After clock stoppage, a scan means inspects the contents of all error history counters to locate the cell with the highest count. This is indicated as the cell which received the earliest error report. The scan means further inspects the code storing register of that cell to identify the exact source of the first error.

12 Claims, 4 Drawing Sheets

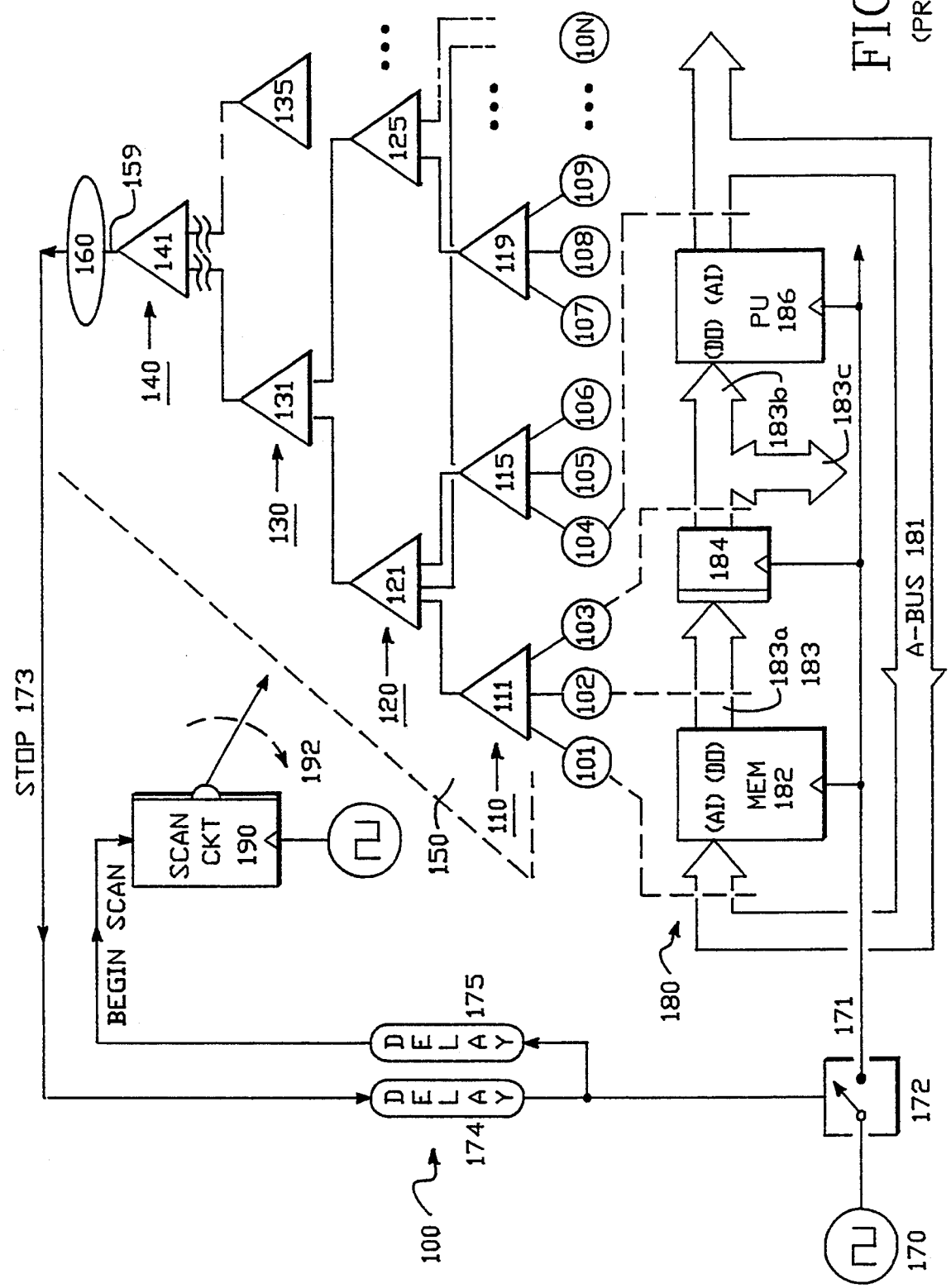
FIG.—1A
(PRIOR ART)

METHOD AND APPARATUS FOR LOCATING SOURCE OF ERROR IN HIGH-SPEED SYNCHRONOUS SYSTEMS

BACKGROUND

1. Field of the Invention

The invention relates generally to high speed synchronous systems. The invention relates more specifically to an improved method and apparatus for locating the source of error in high speed digital computers.

Cross Reference to Related Applications

The following copending U.S. patent application(s) is/are assigned to the assignee of the present application, is/are related to the present application and its/their disclosure(s) is/are incorporated herein by reference:

(A) U.S. Pat. Ser. No. 07/670,289 entitled "SCANNABLE SYSTEM WITH ADDRESSABLE SCAN RESET GROUPS", by Robert Edwards et al, which was filed Mar. 15, 1991 [Atty. Docket No. 7954].

Cross Reference to Related Patents

The following U.S. Patents are assigned to the assignee of the present application and are further incorporated herein by reference:

(A) U.S. Pat No. 3,840,861, DATA PROCESSING SYSTEM HAVING AN INSTRUCTION PIPELINE FOR CONCURRENTLY PROCESSING A PLURALITY OF INSTRUCTIONS, issued to Amdahl et al, Oct. 8, 1974;

(B) PROGRAM EVENT RECORDER AND DATA PROCESSING SYSTEM, U.S. Pat. No. 3,931,611, issued to Grant et al, Jan. 6, 1976;

(C) U.S. Pat. No. 4,244,019, DATA PROCESSING SYSTEM INCLUDING A PROGRAM-EXECUTING SECONDARY SYSTEM CONTROLLING A PROGRAM-EXECUTING PRIMARY SYSTEM, issued to Anderson et al, Jan. 6, 1981;

(D) U.S. Pat No. 4,661,953, ERROR TRACKING APPARATUS IN A DATA PROCESSING SYSTEM, issued to Venkatesh et al, Apr. 28, 1987;

(E) U.S. Pat. No. 4,679,195, ERROR TRACKING APPARATUS IN A DATA PROCESSING SYSTEM, issued to Dewey, Jul. 7, 1987;

(F) U.S. Pat. No. 4,685,058, TWO-STAGE PIPELINED EXECUTION UNIT AND CONTROL STORES, issued to Lee et al, Aug. 4, 1987;

(G) U.S. Pat. No. 4,752,907, INTEGRATED CIRCUIT SCANNING APPARATUS HAVING SCANNING DATA LINES FOR CONNECTING SELECTED DATA LOCATIONS TO AN I/O TERMINAL, issued to Si, et al. Jun. 21, 1988;

(H) U.S. Pat. No. 4,819,166, MULTI-MODE SCAN APPARATUS, issued to Si et al Apr. 4, 1989; and (I) U.S. Pat. No. 4,855,947, MICROPROGRAMMABLE PIPELINE INTERLOCKS BASED ON THE VALIDITY OF PIPELINE STATES, issued to Zmyslowski et al, Aug. 8, 1989.

2. Description of the Related Art

When an error occurs somewhere within a high speed digital computer, it takes a finite amount of time to: (1) detect the error, (2) set an error flag at the point of detection, (3) transmit a message to a central control unit indicating that the error has occurred and (4) transmit control signals from the central control unit to shut off the supply of system clock pulses to all parts of the computer thereby halting all synchronous operations within the computer.

Normal system operations are halted by the above step (4) so that error recovery/repair/isolation mechanisms can take control of all computer parts, log out a snapshot of the halted machine state for later analysis, inspect each part to determine whether data within the part has been infected by the error, and where possible, reprogram or reconfigure the computer to thereby correct or circumvent the problem.

In the time transpiring between steps (1) to (4), error infected data can spread in chain reaction like fashion from one part of the computer to the next. As a general rule, the larger the computer is, the more time it takes for steps (1) to (4) to complete. The faster the computer operates, the faster the infection spreads. (It is possible to add infection containment circuits which slow or contain the spread of error infected data, but this usually has a disadvantageous impact on system performance and is thus typically avoided in high speed designs.)

By the time the supply of system clocks is actually shut off to all parts of the computer, and error recovery/repair mechanisms finally take over, it may be discovered that error flags have been set in numerous areas of the computer.

An important task in the error recovery/repair/isolation process is to identify the location at which the original error occurred. Such "first error" identification is necessary for later error recovery and/or fault isolation and repair work.

There are several aspects of error recovery/repair/isolation which rely on first error identification.

In the case where an error arises from an intermittent fault, such as a loose cable connection or an alpha particle emission, first error identification helps in pinpointing the location of the fault. It is additionally advantageous, for system maintenance purposes, to know when the number of first errors arising from a same location exceed a predetermined threshold value. (When the threshold value is exceeded, the machine is reconfigured or a part is replaced in order to bypass or eliminate the source of the excessive number of errors.)

With regard to error recovery itself, it is necessary to know the locations of all error infected data so that such data may be corrected. It is advantageous to know when and where a first error arose so that recovery mechanisms can trace from that point forward through the system to locate all error infected pieces of data.

High performance mainframe computers (e.g., Amdahl Model 5890) include a first error communication network which is structured both to perform the above error reporting steps (2)–(3) and also to identify the point of first error occurrence.

A conventional first error communication network has a pyramid-like topology which is sometimes referred to as an "error history tree".

A large number of error detection circuits (e.g., parity checkers) lie across the base of the pyramid-like network. Each error detector continuously monitors the state of a corresponding component within the computer and generates an error report signal while an error condition (e.g., a parity fault) is detected.

A central report gathering circuit stands at the peak of the pyramid-like network, waiting to receive error reports from the base detectors. When a first error occurs, and secondary errors follow shortly thereafter, each corresponding error detection circuit launches a respective error report signal into the base of the pyramid-like network. The reports shift upwardly toward the report gathering top of the pyramid.

Error reports from the different detectors race up synchronously through the network along paths of equal delay from the lower levels of the pyramid toward the peak. Only one report survives the race and reaches the central report gathering circuit at the peak.

At each ascending level of the pyramid, plural report carrying paths converge. The first arriving report at each convergence point gets through and simultaneously blocks out later arriving reports. It also leaves a trail marker at the convergence point to identify the path from which it came.

There are fewer and fewer paths at each higher level of the pyramid until there is only one. This last report carrying path leads from the peak convergence point to the central report gathering circuit.

An error report which races ahead of all others and arrives first at the peak convergence point is deemed to belong to the first occurring error. The trail markers left behind by this first error report record the path it followed to reach the top.

Reports which fail to arrive first at any of the convergence points, are not recorded. Records of these late arriving reports are either totally obliterated at the race starting line or cut short by the trails of earlier arriving reports higher up in the network.

When an error report arrives at the peak of the error communication network, the report gathering circuit issues a stopclocks command to shut off the supply of clock pulses to all parts of the computer. A computer shutdown operation then commences. It takes a finite amount of time for shutdown to complete, as already mentioned in the above step (4). Error infected data which is not properly contained can spread through the system like wildfire between the time of first error occurrence and final shutdown.

After shutdown, repair/recovery mechanisms in an independent service processor scan over the first error communication network looking for trail markers. The service processor traces backwards along the preserved path record of the first error report, moving from the peak of the network (the error history tree) down to its base and thus locates the point from which the first error arose.

Several problems plague this trail marking approach. A first problem is that all report delivery paths have to be of equal length. The pyramid has to be symmetrical at all levels. This is required in order to guarantee that a report belonging to a subsequently generated, second error (an error which is second in time relative to the first error) never finds a shortcut which moves that report forward in the race, ahead of the report belonging to the first error.

The symmetry-of-paths requirement means that a same report carrying delay has to be built into all paths of the error communication network irrespective of how near or far any particular error detector is to the report gathering center. By definition, the delay of each path cannot be less than the report forwarding delay of the longest possible path in the communication network.

The response time of the conventional first error communication network is thus constrained by the report delivery time of its worst case path. This is disadvantageous because, in most instances, it is desirable to report errors to a central control unit as soon as possible, rather than as late as possible. An advantage of early reporting is that clocks shut off that much sooner, there is less propagation of error infected data and consequently, subsequent diagnosis is simplified because there are fewer errors to analyze.

Another problem associated with the conventional trail marking approach is that there may be no records made of some late coming error reports at the base layer.

Often, the only record of a second error occurrence (one which arose from the first error) is the trailmarker which should have been recorded at the base of the error history tree. It is possible, however, that a design error may result in no record being made of the second report. By the time system clocks actually stop, the error condition at the secondary point may already have disappeared; its corresponding error detector no longer outputs an error indication; and if a design error allows the error report from the secondary detector to be completely blocked out by the error report issuing from the detector which detects an earlier occurring error, there is no hard evidence left to prove that the second error ever occurred. This places an extra burden on error recovery software. To be effective, recovery software must determine the location of all error infected data and correct each infected data item in order to maintain data integrity. This must be done even in cases where there is no record showing that an infection had occurred. There is always the danger, however, that unanticipated error flows will develop in a machine and that some of these flows will sneak past the error detect/recovery mechanisms, particularly where there is no record of an error infection in an unexpected part of the machine.

If by happenstance, two errors develop almost simultaneously and independently in different parts of a large computer this creates another, somewhat similar problem. The report of one independent error might freeze out the report of the other. The central report gathering circuit is left unaware that the other independent error ever occurred.

Designers of error history trees try to configure their systems so that at least the first of the above-mentioned problems is unlikely to occur. The paramount fear is that a piece of error infected data will enter the system without any record of its occurrence and that recovery software will fail to correct that piece of error infected data. Error propagation paths can be quite complex. It is difficult to guarantee, for designs based on the conventional error history tree, that a trail marker will be left behind for each second occurring error or that recovery will pick up all second occurring errors.

It would be advantageous to have an error communication system which preserves information about latecoming errors so that they are all accounted for during error recovery and so that, during subsequent failure analysis, these latecoming errors can be investigated to determine if and how they are linked to or independent of the first reported error.

SUMMARY OF THE INVENTION

The invention overcomes the above-mentioned problems by providing a unique method and apparatus for locating the source or sources of first and later errors in high speed synchronous systems.

An error reporting network in accordance with the invention has a plurality of either symmetrical or asymmetrical layers. Means are provided in one layer or distributed across layers for recording error reports received from every error detector. At least one layer includes means for condensing received reports into one or more collective reports and for forwarding the condensed report or reports to either a higher level of the network or to the top of the network.

One or more report collecting cells define each network layer. Each cell can receive error reports either directly from error detectors of the synchronous system or from cells in any lower layer. Error reports do not have to propagate through all layers of the network. They can leapfrog over intermediate layers. Moreover, some detectors can deliver their reports directly to the highest layer without suffering the delay of intermediate layers. This advantageously brings the error reports of such detectors to the top of the network in minimum time.

Each cell that receives error reports directly from one or more detectors includes a corresponding set of one or more self-freezing error history latches for storing the one or more directly received error reports. Each cell that receives plural error reports either directly from detectors or indirectly from cells in a lower layer further includes a report condensing means, coupled respectively either to the plural error history latches in that cell, or to a like condensing means in the lower layer cell, for collecting the received plural reports and for issuing a collective error report to a higher level of the network.

Each cell that receives reports directly from plural detectors also includes a report encoding means. The encoding means of such a cell generates a state code representing the state of all error history latches in the cell at the time when one or more first arriving error reports arrive at the cell. If only one report arrives first, the state code identifies the error history latch within its cell which stores that report. A code storing register is additionally included in the cell for storing the state code output by the encoding means at the time a first report is received by the cell.

Moreover, for each cell that receives reports directly from one or more detectors, an error history counter is included in that cell for counting the number of system clock pulses occurring between the time the collective error report issues from the error report condensing means of the cell and the time of clock stoppage.

After system clocks stop, an independently clocked service processor (SVP) scans out the contents of the error history (EH) counters in the network and the contents of the self-freezing EH latches. The SVP locates the cell with the EH counter having the highest count. This is the cell which received the earliest error report or reports. The service processor then scans the code storing register of the located cell to determine from the state code stored therein which error history latch contains a first error report.

BRIEF DESCRIPTION OF THE DRAWINGS

The below detailed description makes reference to the accompany drawings, in which:

FIG. 1A is a block diagram of a previous error history tree structure.

DETAILED DESCRIPTION

Figure 1B:
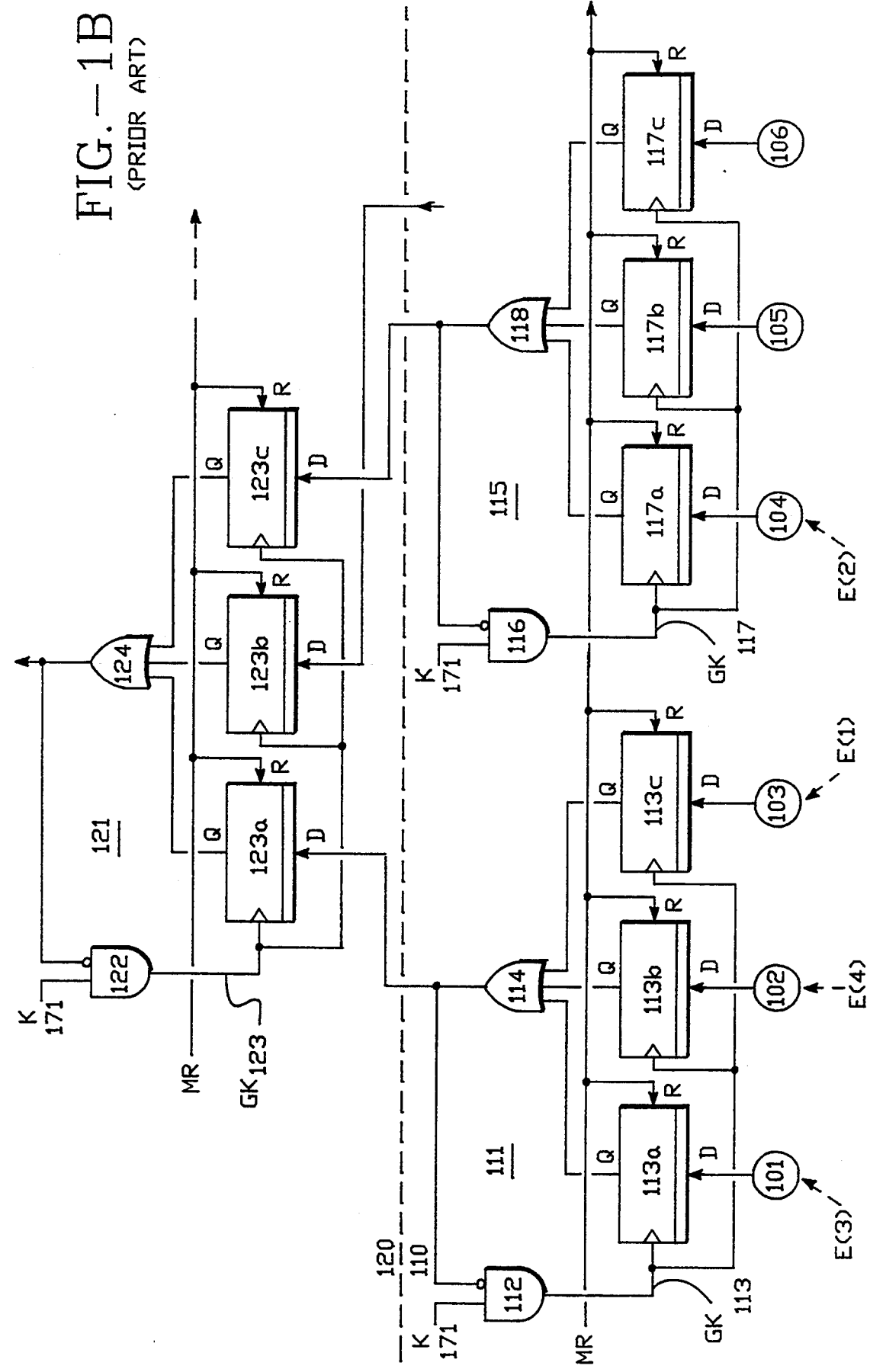
FIGURE 1B is a schematic diagram illustrating the cells of FIG. 1A in more detail.

It is helpful to first review in detail the structure and shortcomings of the conventional error history tree.

FIG. 1A is a block diagram of a previously known synchronous computer 100 having a conventional error history tree structure 150 as earlier described. Circles 101, 102, 103, ... 10N just below the base of the pyramid-like structure 150 represent error detecting circuits (e.g., parity checkers). These are distributed among normal operating circuits (e.g., 181-186) of the computer 100 to indicate the presence of error conditions at those points (only as long as the error condition remains), as will be explained in more detail below.

A system clock generator 170 supplies gated clock signals 171 through a clock gating means 172 to the normal operating circuits (181-186). The normal circuits execute predefined operations while clock signals 171 continue to be supplied and halt their operations when the clock signals 171 stop.

Error history tree 150 is shown to include a first (base) layer 110 of triangular cells 111, 115, 119, etc., located just above detectors 101, 102, etc. Triangles 111, 115, 119, etc. represent a first level of report converging circuits. The internal structures of cells 111, 115, etc., are shown in FIG. 1B and will be described in more detail later.

All error detectors 101, 102, ..., 10N of system 100 deliver respective error reports to corresponding ones of the base level cells 111, 115, 119, etc. Above the first layer of cells 110 are further layers 120, 130, etc., each having fewer cells than a preceding layer. The cells of layers 120, 130, etc. each have internal structures similar to those of cells in the first layer 110. The topmost layer 140 has a single triangular cell 141 supplying a singular error detected signal 159 to a report gathering center 160.

Every cell in the intermediate layers 120, 130, etc. (not all shown) between base and top layers, 110 and 140, receives one or more error reports only from cells in the layer directly below and forwards a corresponding error report only to a cell in the layer directly above.

When an error detected signal 159 arrives at gathering center 160, the gathering center 160 responds by sending a clock stop command 173 to clock gating means 172. It takes a certain amount of time for the gating means to actually halt the system clock pulses 171 and this is represented by delay 174.

A short time (175) after clock pulses 171 stop, an independently clocked scan means (service processor) 190 starts to scan through the error reporting network 150 in a peak-to-base direction 192, looking for trail markers left behind in so-called "error history" (EH) latches (e.g., 123, 113 in FIG. 1B) of the pyramid 150. It uses these trail markers to find the point of first error as will be explained below shortly.

After the point of first error is determined, error recovery/repair mechanisms (not shown) within the scan means 190 are deployed to respectively correct data corrupted by the error, and if necessary, reconfigure data paths in the computer so as to circumvent faulty parts which gave rise to the error in the first place.

A concrete example helps to better explain how the point of first error is found and what problems are encountered in the process. A portion of the normal operating circuits in computer system 100 is shown at 180 for this purpose. Circuit portion 180 comprises a synchronously clocked memory unit (MEM) 182 and a synchronously clocked data processing unit (PU) 186, intercoupled by an address bus 181 and a data bus 183 to form a data processing loop. Data bus 183 comprises sections 183a, 183b and 183c, with a clocked register 184 being interposed between sections 183a and 183b, as shown.

If a fault develops anywhere in the data processing loop, it can introduce a large number of errors into the data produced, stored or carried by components 181-186.

Examples of faults include those created by: (a) alpha particle emissions flipping bits in sensitive storage cells (e.g., inside unit 182); (b) intermittent opens (e.g., between cable contacts or solder connections), (c) intermittent shorts (e.g., between wires inside a cable), (d) timing errors produced by sporadic changes in the microelectronic structure of integrated circuits (e.g., thermally induced) and (e) injections of noise from external sources.

Error detectors 101,102, ..., 10N are appropriately positioned among and coupled to the normal operating circuits 180 of computer 100, each to monitor the condition of data present at a corresponding part of a normal operating circuit and each to generate a localized error reporting signal while an error condition is detected within a corresponding piece of data. Of importance, the error reporting signal lasts only as long as the error condition lasts. It disappears when the error infected data at the detection point is replaced by error free data.

A first error detector 101 is shown coupled (by a dashed line) to detect the presence of error infected data at an address input port (AI) of memory unit 182.

A second error detector 102 is shown coupled across a data output port (DO) of memory unit 182 to check for parity errors in the data immediately output by that memory unit 182. When an error is detected in the data output by the DO port, detector 102 applies an error report signal to cell 111 for as long as the error condition lasts.

The DO port of memory unit 182 drives a first end 183a of data bus 183. While not fully shown, it is to be understood that data bus 183 can include a series of signal resynchronizing registers (e.g., 184) or a series of signal amplifying buffers along its length and that it can operate in a multiplexed mode so that sources other than memory 182 can drive data onto bus 183 from other ends (e.g., 183c) of the bus.

A second end 183b of data bus 183 is shown with third error detector 103 coupled across it to check for parity errors in data present at that point. If data at the DO memory port contains an error and the error infected data propagates to the second end 183b of bus 183, the third detector 103 will responsively send an error report signal to cell 111 at the time that, and as long as, such an error is detected at the second end 183b of data bus 183.

The second end of bus 183 feeds a data input port (DI) of processing unit (PU) 186. PU 186 processes the received data and outputs a responsive signal through an address output port (AO). Fourth error detector 104 is coupled to check for parity errors immediately occurring at the address output port (AO) of processor unit 186.

The AO port of processor unit 186 drives a first end of address bus 181. While not shown, it is to be understood that address bus 181 can include a series of signal amplifying buffers and/or resynchronization registers along its length and that it can operate in a multiplexed mode so that sources other than PU 186 can drive address signals onto bus 181 from other ends (not shown) of the bus.

A second end of address bus 181 is connected to the address input port (AI) of memory unit 182. As mentioned, first error detector 101 is coupled across this AI port of memory unit 182 to check for parity errors at that point.

For the purpose of further illustration, assume that a noise spike enters data bus 183 near its second end 183b and produces a short lived first error state E(1) at the point checked by third error detector 103. Detector 103 sends a correspondingly short lived error report signal to cell 111.

A general notation of the form, $E(m)_p$, is used here to represent each error state. The parentheses enclosed number "m" represents a relative machine cycle in which the error state occurs. And the "p" subscript identifies the location of the error by the number of its corresponding error detector.

A first occurring error is generally represented as $E(1)_p$ where the position p is unknown. In the present example, we know that p=103, and thus the first error state may be expressed as $E(1)_{103}$.

When $E(1)_{103}$ occurs, the repair/recovery mechanisms in box 190 are not yet active and thus they cannot yet know that the point of first error is p=103. In fact, the repair/recovery mechanisms do not become active until many machine cycles after the first error state $E(1)_{103}$ occurs. By that time, error state $E(1)_{103}$ can be long gone and detector 103 might not be outputting a corresponding error report signal, $R(1)_{103}$.

If clock 170 is running at high speed (e.g., 160 MHz), error infection can spread rapidly. The error infected data first originating at the data input port (DI) of PU 186 can produce corrupted data at the address output port (AO) of PU 186, as early as the next machine cycle. The error can then spread to the address input port (AI) of memory unit 182 in the same or a later cycle and it can consequently appear at the data output port (DO) of memory unit 182 in a following clock cycle. One piece of error infected data quickly leads to the next and large amounts of data can be infected with errors in the data processing loop 180 in relatively short time.

As long as third detector 103 detects the first error state $E(1)_{103}$, it sends the corresponding error report $R(1)_{103}$ to cell 111. But by the time the error report $R(1)_{103}$ manages to travel through cell 111, through the higher multiple layers 120, 130, etc. of pyramid 150 to the top circuit 160 and by the time its corresponding stopclocks command 173 travels through delay 174 to gating means 172, to stop clock pulses 171, many machine cycles (e.g. 20) will have transpired. It is likely that, by that time, detectors 101-104 will be reporting completely different, respective error states $E(m'-2)_{101}$, $E(m'-1)_{102}$, $E(m')_{103}$ and $E(m'-3)_{104}$ to pyramid 150, the number m' being an arbitrary cycle count following the occurrence cycle, m=1, of the first error state $E(1)_{103}$. Just as likely, the error conditions may have been so transitory that none of error detectors 101-104 is outputting an error signal when the clocks 171 finally stop. (A data output port, not shown, of PU 186 may have stored error infected data into MEM unit 182 and then, PU 186 may have moved forward to an error free state.)

When the error recovery/repair mechanisms finally become activated, it will not be immediately clear to the activated error recovery/repair mechanisms where the first error state occurred.

The error history tree 150 is designed, however, with a trail marking mechanism that preserves a copy of the first error report $R(1)_{103}$ and helps the scan means 190 to automatically find the location of the first error state $E(1)_{103}$.

Referring to FIG. 1B, the internal structures of cells 111, 115 and 121 are illustrated in more detail. Each of cells 111, 115 and 121 has a respective clock masking gate (112, 116, 122), a respective group of error history (EH) latches (113, 117, 123) and a respective report collecting gate (114, 118, 124) coupled as shown.

More specifically, cell 111 comprises a clock masking AND gate 112 which supplies a group clock signal $GK_{113}$ to its group of error history (EH) latches 113a, 113b, and 113c. The outputs of report generating detectors 101–103 respectively drive the data input terminals (D) of error history latches 113a–113c. A master reset line MR drives the reset (R) terminals of EH latches 113a–113c and also the R terminals of all other EH latches in network 150 (in layer 110 and in higher layers 120, 130, etc.).

All EH latches in network 150 (including latches 113a–113c) are initially reset to the logic zero ("0") state as circuits 180 begin their normal operations. All EH latches initially receive clock pulses from the system clock generator 170 through their respective clock masking gates (e.g. 112, 116, 122). The clock pulses are delivered through a noninverting first input terminal of each clock-masking gate (e.g. 112, 116, 122) and output to each corresponding group (e.g. 113, 117, 123) of EH latches as a group clock signal (e.g. $GK_{113}$, $GK_{117}$, $GK_{123}$). A logic zero ("0") is initially present at an inverting second input terminal of each clock-masking gate (112, 116, 122).

The Q outputs of the EH latches 113a–113c in cell 111 connect to respective inputs of group OR gate 114. The output of group OR gate 114 feeds back to the second, inverting input terminal of clock-masking gate 112.

When the third error detector 103 detects the first error state E(1) on bus end 183b, it passes an error-reporting signal to the D input of corresponding EH latch 113c. This signal remains at logic one ("1") over at least one clock cycle. The Q output of EH latch 113c switches from its initial logic zero state ("0") to the logic one state ("1") on the next occurring clock pulse 171. The group OR gate 114 collects the logic high ("1") output from EH latch 113c and feeds it back to the inverting second input of masking gate 112, thus blocking further clock pulses 171 from passing through the gate 112 to the EH latches of cell 111.

This normally happens well before error detectors 104, 101 and 102 have a chance to detect the subsequent error states $E(2)_{104}$, $E(3)_{101}$ and $E(4)_{102}$ at their respective circuit points and to send error report signals to their respective EH latches, 117a (in cell 115), 113a and 113b.

Because they no longer receive clock pulses, EH latches 113a and 113b are in essence blocked or "frozen out" from responding to error reports later transmitted by respective error detectors 101 and 102. The EH latch group 113 is frozen in an exclusive state wherein only one of its EH latches is set. This exclusive state maintains itself until later cleared by a master reset pulse, MR.

A similar group freeze-out operation develops in the adjoining triangular cell 115. EH latches 117a–117c of cell 115 are not affected by the setting of latch 113c. But when second error state $E(2)_{104}$ develops in circuit 180 shortly after first error state $E(1)_{103}$, the fourth error detector 104 sets its corresponding EH latch 117a and the group OR gate 118 of cell 115 freezes out the EH latches 117b and 117c of corresponding error detectors 105 and 106 through the action of clock-masking gate 116. If detectors 105 and 106 happen to be coupled to circuit portions (not shown) which shortly thereafter develop error states independent of $E(1)_{103}$, such reports are blocked from being recorded in EH latches 117b and 117c.

From the above, it can be seen that each cell of pyramid-like network 150 has an "EH group freezing" function. When any one EH latch becomes set within a cell, its group-masking gate (112, 116, 122) automatically freezes all EH latches of the cell from responding to further inputs.

At the interface between pyramid level 110 and 120, the outputs of group OR gates 114 and 118 respectively connect to the D inputs of EH latches 123a and 123c in the next higher triangular cell 121. (The connection to the D input of latch 123b in this example comes from another (not shown) cell of layer 110.)

Since detector 103 reports before detector 104, EH latch 113c sets at least one clock cycle before EH latch 117a. Consequently, EH latch 123a sets first in cell 121 and freezes out the error report $R(2)_{104}$ stored in EH latch 117a from progressing further up pyramid 150.

The process of latch settings and freeze outs ripples up the remaining layers 130, ..., 140 of pyramid 150 (in synchronism with the system clock), leaving behind only one unbroken trail of set EH latches 113c, 123a, etc. The unbroken trail stretches from the EH latch 113c first set by first-error report $R(1)_{103}$ to a peak EH latch (not shown) positioned in the top cell 141 of pyramid 150.

After the system clock pulses 171 stop, the scan means 190 follows the unbroken trail of set EH latches backwards, from the one EH latch (not shown) set inside peak cell 141 down to the responsible EH latch (113c) in the first layer 110. The unbroken string of set latches reveals the path taken by the first error report. The scan means 190 can thus easily determine where the first error report originated from. Although other EH latches (e.g., 117a) may be set within pyramid 150, the marker trace-back technique is incapable of determining which of the other set latches belongs to a second occurring error E(2), or a third occurring error E(3) and so forth. It can only isolate the one point belonging to the first-reported error state $E(1)_{103}$.

As already mentioned, several disadvantages flow from the trail-marking technique of FIGS. 1A and 1B.

A first problem is that frozen-out EH latches (e.g., 113a, 113b, 117b and 117c) of base cells 111, 115, etc., are blocked from indicating to scan means 190 that additional error states $E(3)_{101}$, $E(4)_{102}$ occurred shortly after the first reported error state $E(1)_{103}$. If these other error states, $E(3)_{101}$ and $E(4)_{102}$ are short-lived, and disappear before scan means 190 clears the EH latches of tree 150 and restarts the gated clocks 171, there will be no record within the EH tree 150 that they ever occurred. Data integrity within the machine might be unwantonly compromised if recovery software fails, for some reason, to correctly determine the full extent of damage caused by first error condition $E(1)_{103}$. (Some error-infected data might slip into memory and remain there, hidden away from the watchful eyes of parity or other checkers until it is too late to recover.)

Also, there is no indication of how many machine cycles transpired between $E(1)_{103}$ and the clocks stopped state. This information would be useful for tracing the propagation of error-infected data through processing loop 180.

Moreover, if independent error states such as $E(3)_{105}$ and $E(4)_{106}$ developed by happenstance, almost simultaneously in circuits monitored by detectors 105 and 106, these slightly later error states would not be recorded in EH latches 117b and 117c of base cell 115. Again, if they are short-lived and disappear before the scan means 190 clears the EH tree 150 and restarts clock 171, there is the danger that their reports (the reports of states $E(3)105$ and $E(4)_{106}$) will be permanently blocked out by the group-freezing action of earlier error report $R(2)_{104}$.

Another problem is that every error report $R(m)_p$ must propagate through an EH latch (e.g., 113c, 123a, etc.) in every layer (e.g., 110, 120, 130, etc.) and must therefore be delayed at least L clock cycles (L being the number of layers in network 150) before the report gathering center 160 can receive the final report 159 and respond by sending a stop command 173 for shutting down the system clocks 171. This disadvantageously gives the first error state $E(1)_{103}$ time to propagate and produce many more error states in the computer 100, e.g., $E(2)_{104}$, $E(3)_{101}$, $E(4)_{102}$, $E(5)_{103}$, $E(6)_{104}$, etc., while the travel time of the first error report is intentionally slowed to that of the longest report carrying path in the machine.

A better approach for identifying first errors and locating later errors is needed.

Figure 2A:
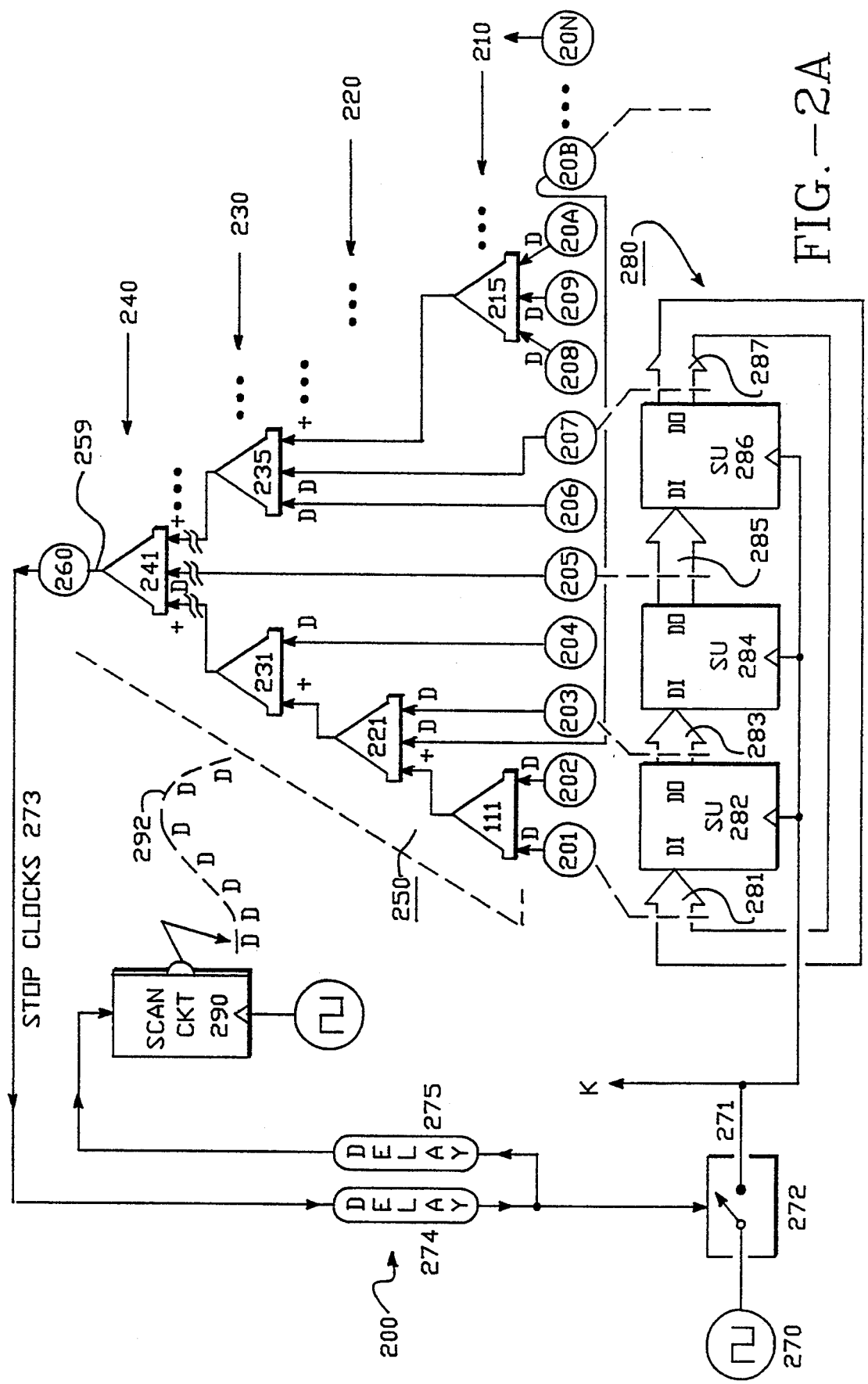
FIG. 2A is a block diagram of an error history tree structure in accordance with the invention.

FIG. 2A is a block diagram of a synchronous system (e.g., computer) 200 which is structured in accordance with the invention. Like reference numerals in the "200" number series are used in FIG. 2A to refer to elements having corresponding but not necessarily similar parts numbered in the "100" series in FIG. 1A.

System 200 includes an error-reporting network 250 having base and higher layers, 210, 220, 230, etc. The peak layer is labelled 240. Circles 201, 202, 203, etc. below the base of reporting network 250 represent error detecting circuits distributed among the normal operating circuits 280 of computer system 200.

Included in the normal operating circuits 280 are a first synchronous unit (SU) 282 which outputs data from a DO port thereof over to a bus end 283 and from there to a DI port of a second synchronous unit (SU) 284 in synchronism with gated system clock pulses (K) 271. The output of SU 284 travels over a bus 285 which ends at the DI input of third SU 286. The output (DO) of SU 286 feeds back from bus end 287 over a common bus to end 281 and from there into the DI port of the first SU 282.

Error detectors 201, 203, 205 and 207 are shown by way of example as being respectively coupled across bus ends 281, 283, 285 and 287 for detecting error states in data passing between SU's, 282, 284 and 286.

It should be apparent from FIG. 2A that unlike the situation in FIG. 1A, some error detectors (e.g., 203, 204, 205) are allowed to send their error reports directly to higher levels of network 250 rather than all being required to send their reports to the base layer 210.

By way of example, error detector 203 reports directly to a "D-type" input of cell 221, with the cell being positioned in second layer 220, while error detectors 201 and 202 report through cell 211 of first layer 210 which then reports to a "plus-type" input of cell 221. (A "D-type" input is one that receives an error report directly from an error detector. A "plus-type" input is one that receives a condensed or collective error report from another cell of network 250. The difference between D-type and plus-type cell inputs will become apparent in due course.)

As further examples of this nonuniform routing of error reports into and through network 250, it should be noted that error detector 204 reports directly to cell 231 of third layer 230. Error reports from detector 203, on the other hand, travel into cell 221, which then reports to a plus-type (+) input of the third layer cell 231. Error reports from detector 205 travel to the top faster because detector 205 reports directly to peak cell 241.

The advantage of this nonsymmetrical coupling of detectors to different layers of network 250 is that some error reports, ($R(m)_{205}$ for example), can be routed to reach a report-receiving center 260 much faster than other reports ($R(m)_{201}$, for example) and they can thus initiate the clock shut-off process all the faster.

The first error report exiting peak cell 241 is not necessarily that of the earliest occurring error as will be understood shortly. The main point is that designers are given the freedom to route error reports into different levels of network 250. This is desirable in cases where the propagation of certain error states needs to be halted more quickly than that of other error states or where the physical makeup and/or topology of the machine gives designers the freedom to inject some error reports directly into higher levels of the network.

It will be noted that each cell 211, 221, etc. of reporting network 250 is represented by a triangle merged on top of a rectangle and that inputs of each cell are labelled as "D-type" or "plus-type" (+). This is done to indicate that cells 211, 221, etc. are structured differently from corresponding triangular cells 111, 121, etc. of FIG. 1A.

Figure 2B:
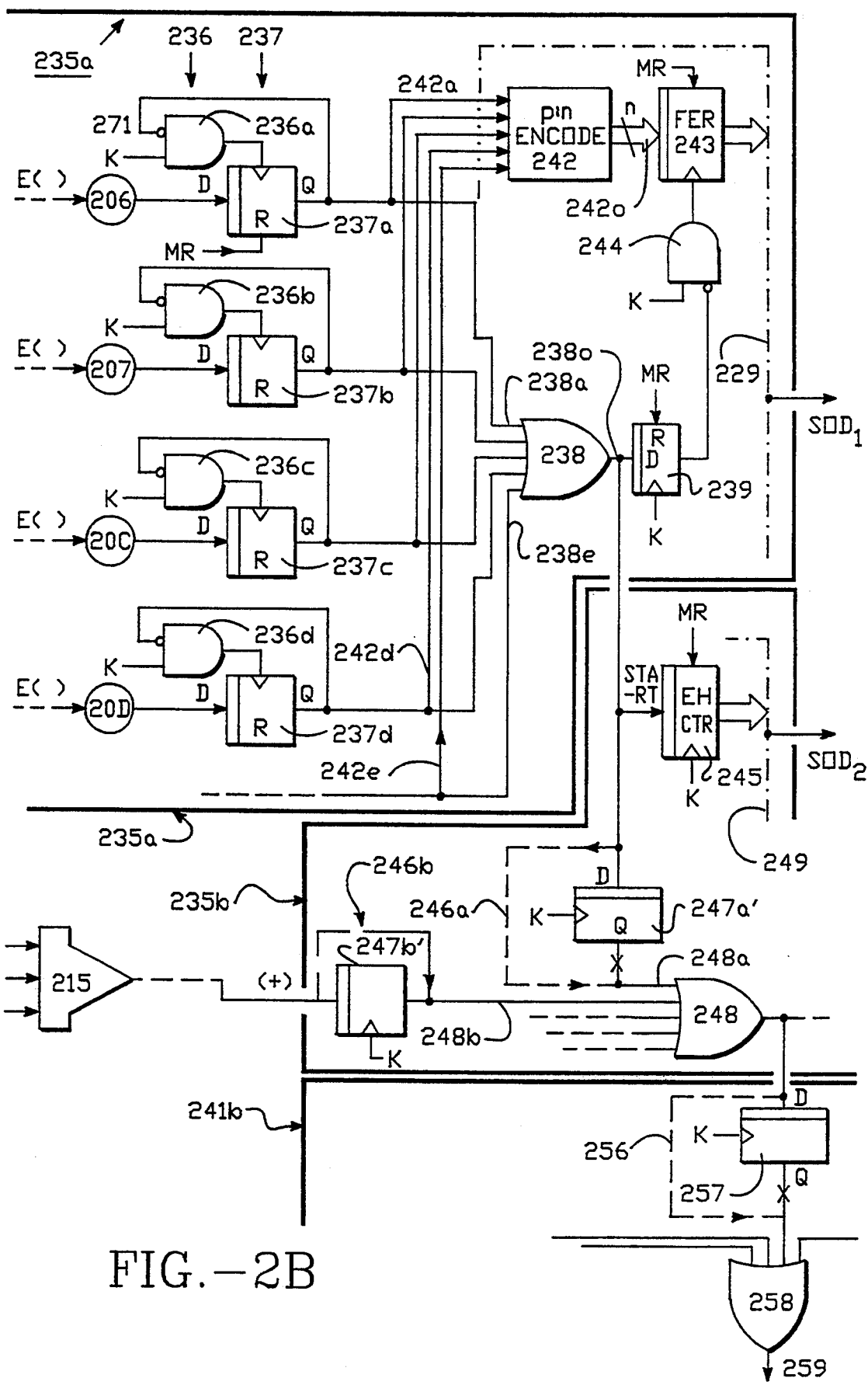
FIG. 2B is a schematic diagram illustrating the cells of FIG. 2A in more detail.

More specifically, each cell of FIG. 2A can include one or more self-freezing error history (EH) latches, an error history (EH) counter, and an error reports condensing means. Where a cell has more than one self-freezing EH latch, the cell includes a first-error identifying register for identifying if and which of the cell's plural EH latches froze before all others. These elements will be described in more detail when FIG. 2B is discussed.

Before looking at the internal details of each cell, it is advantageous to appreciate some further features of system 200 as seen from the big-picture perspective of FIG. 2A. After system clock pulses 271 halt, independently-clocked scan means 290 is activated. Scan means 290 (also referred to as the service processor 290) does not have to scan down network 250 in a top to bottom sequence in order to determine which cell received the first error report, R(1)p. Rather, scan means 290 can merely scan horizontally across the EH network 250 tracing out a locus 292 which runs through every cell that has a D-type input (and a corresponding self-freezing EH latch). The cells of locus 292 can be scanned according to any desired order. Peak cell 241 does not have to be the first inspected cell. Inspections may be ordered according to any desired set of priorities.

The reason for this is that scan means 290 is not looking for a trail of markers left behind by the first error report R(1) in order to identify the location of the first error. Instead, scan means 290 is searching through the error history counters of the cells 211–215 of locus 292, looking for an EH counter holding the highest value.

When such a cell is found, it may have more than one self-freezing EH latch. In that case, scan means 190 next inspects a first error identifying register within that cell and uses a code stored therein for locating not only the position of the error first reported to that cell, but also identifying the relative time (relative to the clock stoppage time) when the first error state $E(i)_p$ was reported.

Locus 292 can run through a very large number of cells (e.g., thousands). For performance reasons, it is advantageous to precede the step of scanning horizontally across the breadth of locus 291 by a step of first scanning down from the top of network 250, following the trail of the error report that was first to arrive at top cell 241 (even though this report is not necessarily that of the first-error $E(1)p$ and to thereby locate a cell among the cells of locus 291 which contains a set EH latch. The result of this scan-down can be used as an aid to localizing a portion of a very-wide locus 292 where EH counters with counts greater than zero are most likely to be found.

For purposes of error recovery, it is preferable and sometimes necessary to have a record of every error state $E(m)_p$, detected at the time of or following the time of the first-occurring error state. The record should cover all errors detected up until the time of clock stoppage.

As scan means 290 inspects the cells of locus 292, it will encounter one or more self-frozen EH latches, each set by an error report received directly from a detector. Each one of the set EH latches corresponds to one of all the error conditions which occurred at or after the time of the first-detected error state $E(1)_p$. Obtaining such a record was not always possible in the earlier system 100 because one error report could block out the recordation of a later-arriving error report. However, as will now be seen, the EH latches of system 200 are constrained to being self-freezing rather than group-freezing, and as a consequence, a record is made of all detectors which issue error reports between the time of first error and clock stoppage.

Referring now to FIG. 2B, the internal structure of cell 235 is shown. It comprises a D-signal receiving section 235a for receiving error reports directly from a corresponding group of error detectors (206,207, 20C, 20D, etc.). Cell 235 further comprises a plus-signal receiving section 235 for receiving a condensed error report signal (238o) from its own D-signal receiving section 235a and for combining it with condensed error reports received from other cells, e.g., 215.

Each of the other cells 211, 221, . . . , 241 of network 250 has a similar internal structure, as will become apparent shortly. However, each cell of network 250 does not of necessity have both a D-signal receiving section (e.g., 235a) and a plus-signal receiving section (e.g., 235b).

Some cells may consist of only a plus-signal receiving section. By way of example, suppose that the direct feed from detector 205 (FIG. 2A) to cell 241 were left out (and cell 241 had no other D-type inputs). In such a case, cell 241 would not have a D-type receiving section (241a, not shown) and cell 241 would therefore consist of only the plus-type section 241b shown in FIG. 2B.

In contrast, some cells may consist of only a D-signal receiving section. By way of example, cell 215 has no plus-type inputs and thus it does not need to include a plus-signal receiving section.

The D-signal receiving section 235a of cell 235 has a report-freezing layer 236 combined with a report-storing layer 237. Report-freezing layer 236 is composed of clock-masking gates 236a, 236b, 236c, etc. The inputs of storing layer 237 include all the D-type signal inputs of cell 235. Storing layer 237 itself consists of EH latches 237a, 237b, 237c, 237d, etc., each dedicated to recording an error report received directly from a corresponding one of detectors 206, 207, 20C, 20D, etc. The outputs of layer 237 couple to both a primary report-condensing OR gate 238 and to a report-state encoder 242 is interposed between the outputs of storing layer 237 and FER 243 for the purpose of reducing the number of bits used to represent the state of storing layer 237. The report-state encoder 242 generates a state code which has fewer bits than the number of outputs from layer 237 and which nonetheless represents the state of report-storing layer 237.

When report-storing layer 237 enters a first error-indicating state (when at least one of its EH latches sets in response to a received error report), the corresponding code output by encoder 242 is captured in first error register (FER) 243 and a cycle counting function is initiated in error history counter 245. The value held in FER 243 when system clock pulses 271 later halt can be used to identify the EH latch 237x (x represents an unknown one of identifiers a,b,c, etc.) in layer 237 which was first to forward an error report to primary condensing gate 238. The value held in the cells EH counter 245 can be used to identify the machine cycle in which condensing gate 238 received its first error report.

Each of error history latches 237a, 237b, 237c, 237d, etc., in report-storing layer 237 latches the level present on its D input when a clock pulse (K) is received and passed through a respective one of clock-masking gates 236a, 236b, 236c and 236d of report-freezing layer 236. Each combination of an EH latch and its masking gate operates to capture and hold an error report at the time the report is received directly from a corresponding detector (206, 207, etc.). Report capture occurs in a self-freezing manner. Receipt of one error report by a first EH latch (e.g. 237a) freezes only that latch in the set state (logic "1"). It does not block a second EH latch (e.g. 237b) from capturing a later received error report. There is no group-freezing action.

When an EH latch (237a, for example) of storage layer 237 sets in response to a report received from an error detector (e.g., 206), it (latch 237a) freezes itself into the set state (logic "1") by feeding its Q output signal back to an inverting input of its respective clock-masking AND gate (236a). This blocks further system clock pulses (K) 271 from passing through the masking gate and clocking that latch. The remaining EH latches of storage layer 237, however, continue to receive system clock pulses (K) 271 through their respective masking gates 236 and are therefore able to capture later arriving reports.

When a first of EH latches 237 sets (or a plurality of EH latches simultaneously set before all others in layer 237), primary report-condensing OR gate 238 collects the logic one ("1") output of the first reporting source (or sources) and forwards it along output line 238o to a higher level of network 250. (Secondary condensing OR gate 248 is considered to be at a higher level of network 250 even though it belongs to cell 235.)

Depending on the distances involved, the condensed report output by OR gate 238 on line 238o can travel either directly along path 246a to a secondary report-condensing OR gate 248 in section 235b of cell 235, if the delay from the input of gate 238 to the output of gate 248 is more than one clock cycle and synchronization with the system clock is desired, a resynchronizing latch 247a' should be interposed in the upward path to bring the output of primary-condensing gate 238 into synchronization with other reports arriving at the other inputs of secondary-condensing gate 248.

Section 235b of cell 235 receives condensed error reports either from its own primary, report-condensing OR gate 238 or from like means (not shown) of lower level cells (e.g., 215) and it condenses them further by combining them in OR gate 248. Section 235b includes the EH counter 245 of cell 235 and all the plus-type (+) report receiving terminals of cell 235. One such terminal (+) is shown by way of example receiving the output of cell 215. Typically, the report-storing layer 237 of a cell (e.g., 235) is positioned within or close to the integrated circuit (IC) chip which contains its corresponding error state detectors (206, 207, etc.). On the other hand, the EH counter 245 of the cell, its plus-type input terminals, and its secondary condensing gate 248, are typically located a distance away, on another IC chip, for example.

It is often advantageous to position the EH counters of several (or all) cells of network 250 within one IC chip together with their secondary report-condensing gates (e.g., 248). Scan data collecting means 249 is provided on that second IC chip for collecting the outputs of the plural EH counters (only one shown is 245) and transferring the data collectively as scan out data (SOD$_2$) to the scan means 290 (FIG. 2A), later during error recovery.

The EH counters (of which only 245 is shown) can consume a significant amount of chip real estate. For one ECL-based embodiment, it was found that each EH counter (245) consumes a chip surface area which could otherwise be filled with fifty gates of functional circuitry. By moving EH counter 245 off of the IC chip which contains cell section 235a, and onto a dedicated IC chip which contains mostly error handling circuitry, it is possible to free up additional "prime" real estate on the mostly-functional IC chip containing cell section 235a.

As a general rule, when the majority of the circuitry on an IC chip is functional circuitry (non-error handling circuitry), it is desireable to minimize the amount of chip surface area consumed by error handling circuitry. On the other hand, most IC chips have a limited number of I/O pins and it is also generally desireable to minimize the number of I/O pins that are dedicated to error handling functions. Typically, a trade-off has to be made between minimizing the chip surface area consumed by error handling circuitry and minimizing the number of I/O pins consumed by error handling functions. Note that in FIG. 2B, only one I/O pin is respectively consumed in each of the IC chips containing respective cell sections 235a and 235b. The one pin of each respective IC chip carries the condensed error report from output terminal 238o of condensing gate 238 to the count starting terminal of EH counter 245 and to an input of secondary condensing gate 248. Depending on circumstances, it may be desireable to draw chip crossing boundaries through other portions of each EH cell. By way of example, FER 234, gate 244 and latch 239 can be moved from the IC chip which in FIG. 2B contains cell section 235a to the IC chip which in FIG. 2B contains cell section 235b. The advantage of such a move would be that chip space consumed by FER 243 would be made available for additional functional circuitry on the IC chip shown to contain cell section 235a. The disadvantage would be that the I/O pin count for error handling would increase by the value, n, the latter being the number of output terminals extending from encoder 242 to FER 243. In such a case, it might be advantageous to change the design of encoder 242 such that an optimal balance is found between the number of I/O pins consumed by its n output terminals and the chip surface area consumed by encoder 242.

As an additional variation, a further chip crossing boundary might be drawn between error detectors 206, 207, 20C, etc., and report receiving layer 237.

A further advantage of having all EH counters centralized on one or a few chips, such as the IC chip which contains cell section 235b, is that it can simplify recovery software. The software does not have to scan through a large number of IC chips, addressing each individually, when it is searching for the EH counter with the highest count.

Given the above discussion, the boundaries drawn in FIG. 2B around cell sections 235a and 235b may be viewed, not only as section boundaries, but also as IC chip boundaries. A primary, condensed error-reporting signal coming from OR gate output 238o leaves the IC chip containing cell section 235a and travels across a printed circuit board trace (and/or over an interconnect cable) to reach the IC chip containing cell section 235b. Because the signal delay time can be fairly long, resynchronization register 247a is preferably provided at the input of the second chip for synchronizing the signal to the system clock (K) before applying the signal to an input 248a of the secondary report-condensing OR gate 248.

Similarly, another resynchronization register 247b is preferably provided (if needed to maintain synchronous behavior) at the chip input which receives an error report from either a section 215a or 215b (neither shown) of cell 215 and forwards that report to input terminal 248b of OR gate 248. Alternatively, the report from cell 215 travels by way of direct path 246b into OR gate 248.

Moving higher up network 250, it is seen that the secondary section 241b of cell 241 optionally includes a further resynchronization register 257 for aligning the output of gate 248 (where necessary) with the system clock (K) before applying it to the secondary condensing gate (OR gate) 258 of cell 241. If resynchronization is not necessary at that point, a direct connection 256 is made between the output of OR gate 248 and the input of OR gate 258 so that error reports reach the top of network 250 as quickly as circumstances allow.

Condensed error reports travel up the network 250 either directly from one condensing gate 248 to the next 258 (by way of direct connections 246a, 246b, 256) or the condensed reports ripple through occasional resynchronization latches (e.g., 247a, 247b, 257) until a peak, condensed error-report 259 emerges from the condensing OR gate 258 in top cell 241 and alerts the report gathering center 260 to issue a stop-clocks command 273.

At the same time that a condensed error report moves out of OR gate 238 toward the peak cell 241, the logic "1" output of OR gate 238 enables EH counter 245 to begin incrementing its internal count for each of the next-received set of system clock pulses (K) 271.

EH counter 245 is preferably reset to a zero count (by scan means 290) before the output of gate 238 goes to "1" and it increments by one for every succeeding clock pulse. EH counter 245 should be provided with enough capacity (e.g., 5 bits) to count from zero at least to the maximum number of clock cycles which can transpire between the time its cell receives an error report and system clock shutdown. When the system clock pulses 271 finally stop, EH counter 245 contains a count of the number of clock pulses which transpired between the time output line 238o of its cell 235 went to logic one ("1") and the last system clock pulse 271 issued. At the same time that EH counter 245 is enabled, the logic "1" from gate 238, passes through delaying latch 239 and freezes a state code of cell 235 which was last loaded into FER 243 by forcing a logic zero ("0") output out of clock-masking gate 244. Gate 244 supplies system clock pulses 271 to FER 243.

The state code last loaded into FER 243 comes from encoder 242 of cell 235. The frozen state code indicates whether none, one, or more than one of encoder input terminals 242a, 242b, etc., was at the logic one level ("1") when the supply of clock pulses to FER 243 was frozen. The supply of clock pulses to FER 243 can be cut off either at the FER-freezing gate 244 or at gating means 272 (FIG. 2A).

Encoder 242 has a number, p, of input terminals (labelled individually as 242a, 242b, etc.) and a number, n, of output terminals (labelled collectively as 242o). The number of output terminals, n, is preferably less than the number of input terminals, p. More preferably, encoder 242 is a so-called "2 of N" type encoder where the relation between p and n is given by:

$$p = n!/[2(n-2)!]. \quad (Eq. 1).$$

Examples of p:n ratios which satisfy the above Equation 1 include, 15:6, 21:7 and 28:8. The number, p, of inputs on encoder 242 will vary from cell to cell depending on the number of D-type inputs which the cell has.

Typically, each functional IC chip of system 200 (each chip which contains functional components such as those of units 282–286) will have only one primary cell section (e.g., 235a) provided within that functional IC chip. The IC chip will also contain the plurality of error detectors (206, 207, etc.) coupled to its functional components. The number of encoder inputs, p, provided in each cell (of each functional IC chip) is selected as the smallest value which satisfies Equation 1, while at the same time being equal to or greater than the number of D-type inputs for the cell. FER 243 is provided with n bits of storage capacity to store the n bits output by encoder 242.

A "2 of N" encoder produces a unique output code in which only two bits are active at logic "1") when a unique one and no other of the p inputs of the encoder is activated (switched to logic "1"). If only one of input terminals 242a, 242b, etc., is at logic one when the supply of clock pulses to FER 243 is frozen, then FER 243 stores a value with only two bits at logic one (e.g., "01000100"), the stored "2 of N" code identifying which unique one of input terminals 242a, 242b, etc., was so set.

If none of terminals 242a, 242b, etc., is at logic one when the supply of clock pulses to FER 243 is frozen, then FER 243 stores a zero value (all its bits are at logic "0").

If the value frozen in FER 243 has a number of set bits other than two or zero, this indicates that at least two of input terminals 242a, 242b, etc., switched to the logic one state in the same clock cycle. The last condition may fail to uniquely identify which two or more input terminals 242a, 242b, etc., simultaneously. However, it does provide recovery software with the information that at least two error detectors simultaneously reported error conditions.

Scan collecting means 229 are provided on the IC chip containing primary cell section 235a for collecting and transferring as scan output data (SOD$_1$), the first-error code stored in FER 243 to the independently-clocked service processor 290. On-chip scan collecting means 229 can also transfer the individual states of all encoder input terminals 242a, 242b, etc., to the service processor 290.

At a minimum, after system clock pulses 271 stop, the service processor 290 can determine whether and which of error detectors 206, 207, etc., reported at least one error condition; and in the case where one of the corresponding EH latches 237 became set at least one cycle ahead of all other EH latches of the same cell 235, the service processor 290 can also determine which of the error-state detectors 206, 207, etc., was first to report an error condition.

Those skilled in the art will recognize the "2 of N" to be a special case of a "M of N" encoder. Other values of M which may be used include 3, 4, 5 and so forth. The following equation 2 gives the relationship between the number of encoder input terminals, p, and the number of encoder output terminals, n, for a "M of N" encoder.

$$p = n!/[m!(n-m)!] \quad (Eq. 2)$$

The value M=2 was found to be optimal for the purpose of minimizing the amount of chip surface area consumed by encoder 242 while at the same time providing an output which distinguishes between one and plural error reports being received in the same clock cycle. If additional information is desired for purposes of error recovery, other values of M, such as 3, 4, 5, etc., may be used. When M=1, encoder 242 is simply replaced by a set of wires carrying lines 242a–242e directly to the input terminals of FER 243. It may be desireable to use the value M=1 for IC chips which have less than five error detectors (206, 207, 20C, etc.) on the chip. In such a case, the increase in surface area consumed by FER 243 may be offset by the surface area not consumed by encoder 242.

Encoder 242 can be implemented alternatively as a straightforward binary encoder with additional logic added for indicating when multiple inputs are simultaneously active. Such an embodiment may consume more chip surface area than a "M of N" encoder, but then again, chip surface area may not be a prime concern in some applications.

Referring to the combination of FIGS. 2A and 2B, assume that an error state is first reported by detector 203, then 205, then 207 and 201 in an around-the-loop manner similar to the one discussed before. Assume also that a slightly later error state is independently reported by detector 206 while system clocks 271 are still running.

The EH counter in cell 221 begins counting first when the output of the primary report-condensing OR gate (not shown) in that cell 221 switches to logic "1" in response to the error report from detector 203. The error history counter in cell 241 begins counting at least one cycle later in response to the error report of detector 205. The respective error history counters of cells 235 and 211 begin counting even one cycle later in response to the error report they respectively receive from detector 207, and from detector 201.

After clock pulses 271 (K) halt, the scan circuit (service processor) 290 inspects the error history counts in all cells having D-type inputs. It finds the highest count in cell 221, a lower count in cell 241 and even lower counts in cells 235 and 211.

Incidentally, if detector 204 does not issue an error report before clock stoppage, there will be a zero count in the EH counter of cell 231. The EH counter of each cell begins to count only after the cell receives an error report through one of the D-type inputs of the cell. Condensed reports which propagate through the plus-type inputs of the cell do not activate the EH counter of the cell.

After identifying cell 221 as the cell with the highest EH count, the scan circuit 290 next inspects the first error register (FER) of cell 221 and finds it to contain a state code specifying an error report received from detector 203 rather than from any other D-type inputs (not all shown) of Cell 221 as the first-received D-type error report of that cell.

Not withstanding the fact that cell 221 received the first error report, the scan means 290 can inspect all other EH latches (not shown) in that cell 221 and the EH latches of all other cells, 211, 231, 241, 235, 215, etc. which have D-type inputs to determine whether error reports issued from any of the other error detectors in the system between the time of first error and clock stoppage. A record is made of each detector that reports because the EH latches are self-freezing rather than group-freezing. For example, if an independent error occurred at an interface monitored by detector 20B before clock pulses 271 stop, this will set a corresponding self-freezing EH latch in cell 221. The scan means 290 will be able to detect such an occurrence even though cell 221 also receives the first error report E(1)103 because the setting of each error history latch freezes out only itself and no other error history latches.

The above disclosure is to be taken as illustrative of the invention, not as limiting its scope or spirit. Numerous modifications and variations will become apparent to those skilled in the art after studying the above disclosure.

By way of example, the encoder 242 of each cell can be eliminated and FER 243 can receive the p input bits directly. A second EH counter can be added to each cell to count elapsed clock cycles between a second received report and clock stoppage.

Given the above disclosure of general concepts and specific embodiments, the scope of protection sought is to be defined by the following claims.

What is claimed is:

1. In a system having a plurality of report-generating error-detectors, a multilayered network of error-communicating cells, the network comprising:
   a base layer composed of at least two error-communicating cells and a top layer having one error-communicating cell, said top layer being operatively coupled to the base layer for receiving error reports from the base layer;
   wherein each cell includes:
      input means for receiving a plurality of error reports either directly from report-generating error-detectors or from error-communicating cells in other layers;
      report condensing means, coupled to the input means of the cell, for collecting all error reports received by the input means and responsively outputting a collective error report indicating that the input means has received one or more error reports; and
   wherein each cell that receives one or more error reports directly from a corresponding number of one or more detectors includes:
      a corresponding number of report storing means, coupled to the input means, for storing error reports received by the input means directly from the report-generating error-detectors, each report storing means having a self-freezing function for preserving its respectively received error report; and
      input state preserving means, coupled to the report storing means and to the report condensing means, for storing a state code indicating whether one or more error reports were stored by the report storing means when the report condensing means of the cell outputs a collective error report.

2. The multi-layered network of claim 1 wherein at least one of the cells that receives error reports directly from detectors is a direct-report-receiving cell which receives a plurality of as many as p reports and wherein the state code stored in each such direct-report-receiving cell further indicates if and which of the as many as p error reports received directly by the cell was first received directly by the cell.

3. The multi-layered network of claim 2 wherein each direct-report-receiving cell further includes encoding means having p input terminals and n output terminals, n being less than p, for encoding the state of the report storing means and outputting an encoded state code of n bits to the input state preserving means for storage therein, the encoded state code indicating whether zero, one, or more than one error reports were directly received by the input means when the report condensing means of the cell outputs a collective error report and, if a singular error report was first received directly by the cell, which of the as many as p error reports received directly by the cell was first received.

4. The multi-layered network of claim 3 wherein the encoding means of each direct-report-receiving cell satisfies the relation:

$$p=n!/[2(n-2)!].$$

5. The multi-layered network of claim 3 wherein the encoding means of each cell is a "2 of N" encoder structured so that two of its n output bits differ from the other output bits if only one of its p input bits differs from the other input bits.

6. The multi-layered network of claim 3,
   wherein said system is a synchronous system having system clock means for generating system clock pulses;

wherein said synchronous system includes clock stopping means, operatively coupled to the system clock means, for halting said system clock pulses;

wherein the top layer of the network sends its collective error report or reports to said system clock stopping means, wherein the system clock stopping means responsively halts the system clock pulses after receipt of the collective error report or reports, and wherein each direct-receiving cell of the network includes an error history counter for counting the number of elapsed clock pulses between the time the report condensing means of the cell outputs a collective error report and the time system clock pulses halt.

7. The multi-layered network of claim 1, wherein the input means of at least one cell in a layer above the base layer receives at least one error report directly from a report-generating error-detector.

8. The multi-layered network of claim 1, wherein the input means of at least one cell in a layer above the base layer receives at least one error report directly from the report condensing means of a cell in a lower layer over a report carrying path having a delay time less than one clock cycle.

9. An apparatus for locating a source of first error in a synchronous system, where the system has a plurality of potential sources for error and a corresponding plurality of error detectors each coupled to one of the sources for issuing an error-reporting signal at the time its corresponding source produces an error condition, the apparatus comprising:

a plurality of self-freezing report-storing means, each coupled to receive a respective error-reporting signal either directly or indirectly from a corresponding one of the error detectors, where each report-storing means includes storage means for storing an error-report representing a received error-reporting signal and means for freezing the actions of its storage means upon receipt of the error-reporting signal to thereby preserve the stored error-report;

report-collecting means, coupled to each of said report-storing means, for collecting stored error-reports, if any, from said report-storing means and issuing a collective error report when any one or more of the report-storing means contains an error-report; and code-storing means, responsively coupled to said plurality of report-storing means and to said report-collecting means, for storing a first-error code indicating which of the report-storing means contains an error-report when a collective error report first issues from the report-collecting means.

10. The apparatus of claim 9, where said synchronous system includes clock stoppage means, responsive to collective error reports issued from said report-collecting means of the apparatus, for stopping system clocks one or more cycles after a first collective error report is received, the apparatus further comprising:

error history counting means, coupled to the report-collecting means, for counting the number of system clock cycles occurring between clock stoppage and the time a collective error report issues from the report-collecting means.

11. The apparatus of claim 10 further comprising scan means for scanning the contents of said error history counting means and said code-storing means after clock stoppage.

12. A method for locating a source of first error in a synchronous system having many potential sources of first error, the method comprising the steps of:

(a) receiving error reports from the many potential sources of first error;

(b) storing each received report in one of a first plurality of self-freezing latches;

(c) distributing the first plurality of self-freezing latches into a second plurality of cells, each cell containing a subset of the self-freezing latches;

(d) in each cell, collecting reports stored in the self-freezing latches of the cell and producing therefrom a collective error report for the cell;

(e) in each cell which receives one or more error reports, preserving an input state code indicating which self-freezing latch or latches contained error reports at the time a collective error report was produced for the cell;

(f) transmitting the collective error reports of all cells to a clock-stopping means, the clock-stopping means halting system clock pulses after receipt of one of said collective error reports; and (g) in each cell which produces a collective error report; counting the number of clock pulses which elapse between the time the cell produces its collective error report and the time system clock pulses stop.

* * * * *